(12) United States Patent
Morishima (10) Patent No.: US 7,181,250 B2
(45) Date of Patent: Feb. 20, 2007

(54) MOBILE PHONE

(75) Inventor: Masaaki Morishima, Tokyo (JP)

(73) Assignee: NEC Corporation, Tokyo (JP)

( * ) Notice: Subject to any disclaimer, the term of this patent is extended or adjusted under 35 U.S.C. 154(b) by 483 days.

(21) Appl. No.: 10/279,973

(22) Filed: Oct. 25, 2002

(65) Prior Publication Data

US 2003/0083107 A1 May 1, 2003

(30) Foreign Application Priority Data

Oct. 26, 2001 (JP) .............................. 2001-329095

(51) Int. Cl.
*H04B 1/38* (2006.01)

(52) U.S. Cl. ................ 455/566; 455/575.3; 455/550.1; 379/433.04; 379/433.06; 379/433.13

(58) Field of Classification Search ............... 455/90.1, 455/90.2, 90.3, 550.1, 575.1, 575.3, 575.4, 455/575.8, 566, 567; 379/433.01, 433.04, 379/433.06, 433.07, 433.11, 433.12, 433.13, 379/434
See application file for complete search history.

(56) References Cited

U.S. PATENT DOCUMENTS

| | | | | |
|---|---|---|---|---|
| 5,542,103 | A * | 7/1996 | Mottier et al. | ............... 455/566 |
| 5,848,362 | A * | 12/1998 | Yamashita | ................... 455/567 |
| 6,125,286 | A | 9/2000 | Jahagirdar et al. | |
| 6,571,086 | B1 * | 5/2003 | Uusimäki | ............... 379/433.06 |
| 6,980,835 | B2 * | 12/2005 | Hama | .......................... 455/567 |

| | | | |
|---|---|---|---|
| 2001/0003707 | A1 * | 6/2001 | Moriya ........................ 455/566 |
| 2002/0146989 | A1 * | 10/2002 | Moriki ........................ 455/90 |

FOREIGN PATENT DOCUMENTS

| | | |
|---|---|---|
| GB | 2 355 145 A | 4/2001 |
| GB | 2 358 318 A | 7/2001 |
| JP | 2000-36974 | 2/2000 |
| JP | 2000-188629 | 7/2000 |
| JP | 2000-316045 | 11/2000 |
| JP | 2000-358086 | 12/2000 |
| JP | 2001-86204 | 3/2001 |

(Continued)

OTHER PUBLICATIONS

European Search Report dated Jan. 30, 2004.

*Primary Examiner*—Quochien B. Vuong
(74) *Attorney, Agent, or Firm*—McGinn IP Law Group, PLLC (57) ABSTRACT

A mobile phone of the present invention has a structure in which a second case is provided with a sub-display unit and an LED for indicating an incoming call, both of which can be watched even in a state where the mobile phone is folded. The sub-display unit is provided on a back surface opposite to a main surface on which a main display unit is provided. Moreover, the mobile phone of the present invention is provided with a sub-operation unit on a side surface of a first case. The sub-operation unit is provided with a first operation key, a second operation key, and a third operation key. Correspondingly to these keys, a short cut function is registered in a storage unit for setting a useful function (for example, a ring tone, an LED for indicating an incoming call, or the like) for a case in which a change is made in a state where the mobile phone is folded.

26 Claims, 6 Drawing Sheets

FOREIGN PATENT DOCUMENTS

| | | |
|---|---|---|
| JP | 2001-111656 | 4/2001 |
| JP | 2001-136248 | 5/2001 |
| JP | 2001-211240 | 8/2001 |
| JP | 2001-268165 | 9/2001 |
| JP | 2002-320012 | 10/2002 |
| WO | WO 00/59179 | 10/2000 |

* cited by examiner

MOBILE PHONE

BACKGROUND OF THE INVENTION

1. Field of the Invention

The present invention relates to a mobile phone of a folding type.

2. Description of Related Art

Figure 1:
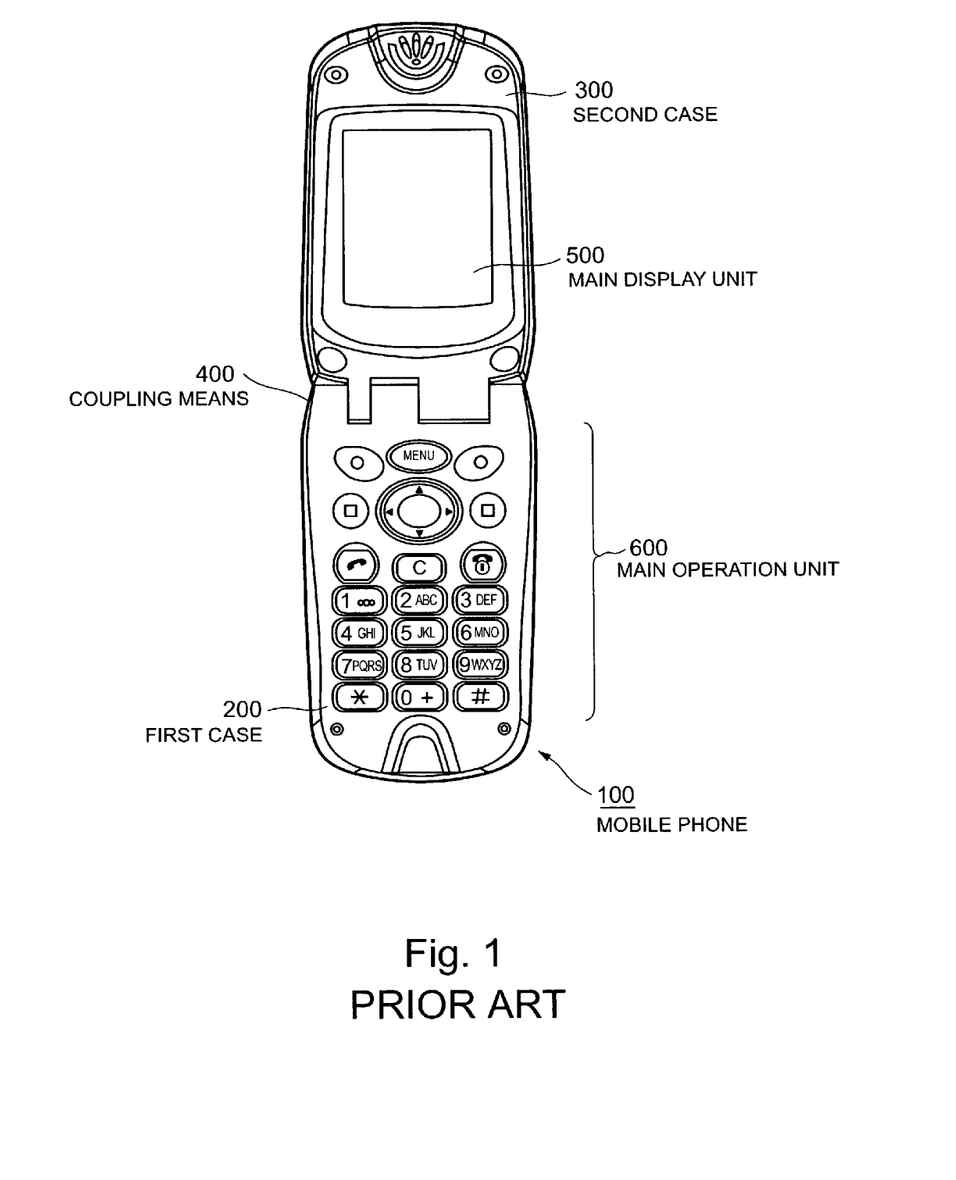
FIG. 1 is a plan view showing a structure of a conventional mobile phone of a folding type.

FIG. 1 is a plan view showing a structure of a conventional mobile phone of a folding type. As shown in FIG. 1, in the conventional mobile phone, a first case 200 and a second case 300 are coupled by use of coupling means 400. The conventional mobile phone has a structure in which the second case 300 can be opened and closed. Such a mobile phone 100 of a folding type has a feature in that the mobile phone 100 is easy to be housed because of compactness thereof in a state where the mobile phone 100 is folded. Note that FIG. 1 shows a plan view of the mobile phone 100 when the second case 300 is opened.

The first case 200 is provided with a main operation unit 600 for entering a phone number and performing various operations on a main surface thereof. The main operation unit 600 is provided with a plurality of operation keys including a menu key, a cursor key, a select key, a cancel key, and a short cut key, for example.

The second case 300 is provided with a main display unit 500, of a liquid crystal display (LCD) on a main surface thereof, the main surface facing the main operation unit 600 in the state where the mobile phone 100 is folded. The main display unit 500 displays character information such as a phone number and an electronic mail.

A back surface (not shown) of the second case 300 is provided with a light emitting diode (LED) for indicating an incoming call, the LED lighting up upon receiving an incoming call. For the LED for indicating an incoming call, it is possible to select one color among plural kinds of colors of light which are registered previously.

Moreover, the first case 200 is provided with a control unit (not shown) and a storage unit (not shown). The control unit is intended to select and set various functions included in the mobile phone 100 in accordance with instructions entered by use of the operation keys. The storage unit stores image information to be displayed on the main display unit 500 and various types of information registered by a user.

Next, in the structure described above, operation procedures of the conventional mobile phone will be described with reference to FIGS. 2A to 2C. Note that, in the following, a description will be given by taking as an example a case in which a ring tone (Ringer Call) of the mobile phone 100 is set to a desired sound or melody. It is assumed that plural kinds of ring tones or melodies are previously registered in the storage unit.

Figure 2A:
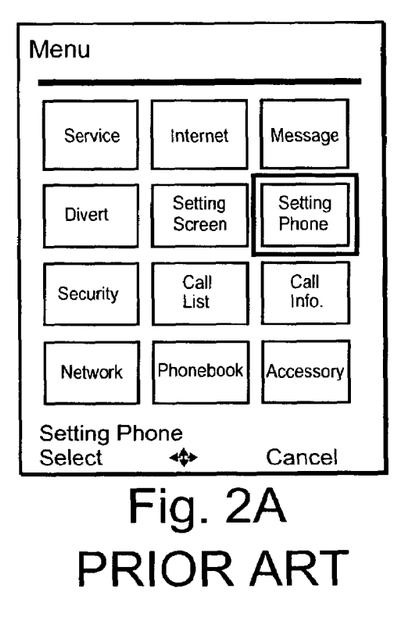
FIGS. 2A, 2B, and 2C are plan views showing examples of a screen displayed on a main display unit of the conventional mobile phone of the folding type.
Figure 2B:
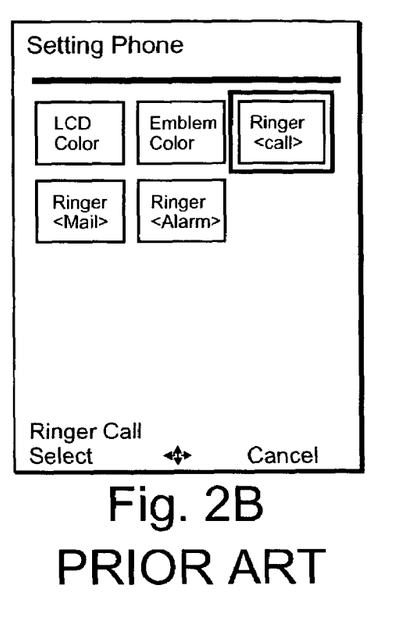
Figure 2C:
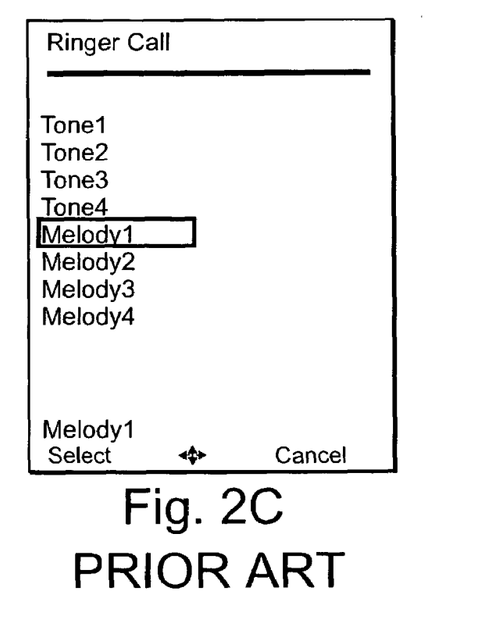

FIGS. 2A to 2C are plan views showing examples of screens which are to be displayed on the main display unit of the mobile phone 100 shown in FIG. 1.

When the main display unit 500 is in a standby state, if the user of the mobile phone 100 pushes the menu key, the control unit causes the main display unit 500 to display a menu screen shown in FIG. 2A.

Subsequently, if the user operates the cursor key while watching the menu screen to move a cursor to a desired select item (in this case, "Setting Phone") and then pushes the select key, the control unit determines a setting of "Setting Phone" and causes the main display unit 500 to display a select screen shown in FIG. 2B. At this time, it is also possible to cancel the determination of the "Setting Phone" by pushing the cancel key.

Next, if the user operates the cursor key while watching the "Setting Phone" screen to move the cursor to a desired select item (in this case, "Ringer Call") and then pushes the select key, the control unit determines a setting of "Ringer Call" and causes the main display unit 500 to display a select screen shown in FIG. 2C.

Finally, if the user operates the cursor key while watching the "Ringer Call" screen to move the cursor to a desired select item (in this case, "Melody 1") and then pushes the select key, the control unit determines a setting of "Melody 1."

As described above, in order for a user to set a desired function for the mobile phone 100, the user is required to operate the operation keys for a number of times. Accordingly, the user has to take a lot of time and efforts to operate. The conventional mobile phone 100 is very inconvenient particularly in a case where the user wants to change a setting frequently. A short cut key is intended to be used for solving such a problem. By registering a specific select item previously, it is possible to jump to a desired select screen in one operation with the short cut key.

For example, if "Ringer Call" is registered in advance correspondingly to a short cut key, it is possible to switch directly to the screen shown in FIG. 2C in an operation with the short cut key.

In the conventional mobile phone 100 of the folding type, there is a demand for a simple operation in the state where the mobile phone 100 is folded. However, in the state where the mobile phone 100 is folded, the main display unit and the main operation unit cover each other, and therefore there is a problem in which the main display unit cannot be watched and in which an operation by use of the main operation unit can not be performed. Moreover, if the main operation unit cannot be operated, it is also impossible to use a short cut function as described above. Accordingly, in a case where the user frequently changes the ring tone or the color of light of the LED for indicating an incoming call, the user has to open the second case 300 every time the user makes a change. Thus, the user takes a lot of time and efforts.

The present invention is intended to solve the above described problems inherent in the conventional technology. It is an object of the present invention to provide a mobile phone in which a ring tone and a color of light of an LED for indicating an incoming call are easily changed even in a state where the mobile phone is folded.

SUMMARY OF THE INVENTION

A mobile phone of the present invention is a mobile phone of a folding type which includes a first case and a second case, the first case including a main operation unit, the second case including a main display unit on a main surface thereof, the main operation unit and the main display unit being covered in a state where the mobile phone is folded. The mobile phone includes: a sub-display unit which can be watched in the state where the mobile phone is folded, the sub-display unit being provided on any one of the first case and the second case; a sub-operation unit which can be operated in the state where the mobile phone is folded, the sub-operation unit being provided on any one of the first case and the second case; and a control unit for setting a useful function for a case in which a change is made in accordance with an operation by use of the sub-operation unit in a state where the first case and the second case are folded.

Here, the sub-display unit may be located on a back surface of the second case, the back surface being reverse to the main surface of the second case.

Moreover, the sub-operation unit may be located on a side surface of the first case, the side surface being along a long edge of the first case.

Moreover, the sub-operation unit may include a short cut function for setting a useful function for a case in which a change is performed in a state where the mobile phone is folded.

Moreover, the sub-operation unit may include a select key for selecting a ring tone which is previously registered and a scroll key for changing a type of the ring tone, and the sub-display unit may display the type of the ring tone in accordance with an operation of the scroll key.

Furthermore, the sub-operation unit may include a select key for selecting a color of light of an LED for indicating an incoming call, the LED being previously provided on the second case; and a scroll key for changing the color of light of the LED for indicating an incoming call, and the sub-display unit may display a color type of light of the LED for indicating an incoming call in accordance with an operation of the scroll key.

A mobile phone of a structure as described above has a sub-display unit and a sub-operation unit, each of which is provided on any one of a first case and a second case. Thus, it is possible to easily change a ring tone and a color of light of an LED for indicating an incoming call by use of the sub-operation unit while watching the sub-display unit even in a state where the mobile phone is folded.

Moreover, if the sub-operation unit is located on a side surface of the first case along a long edge of the first case, it is possible to secure a larger area for providing operation keys in comparison with a case where the sub-operation unit is located on a side surface of the first case along a short edge of the first case.

BRIEF DESCRIPTION OF THE DRAWINGS

The above and other objects, features and advantages of the present invention will become apparent from the following detailed description when taken in conjunction with the accompanying drawings wherein.

DETAILED DESCRIPTION OF THE PREFERRED EMBODIMENT

Figure 3:
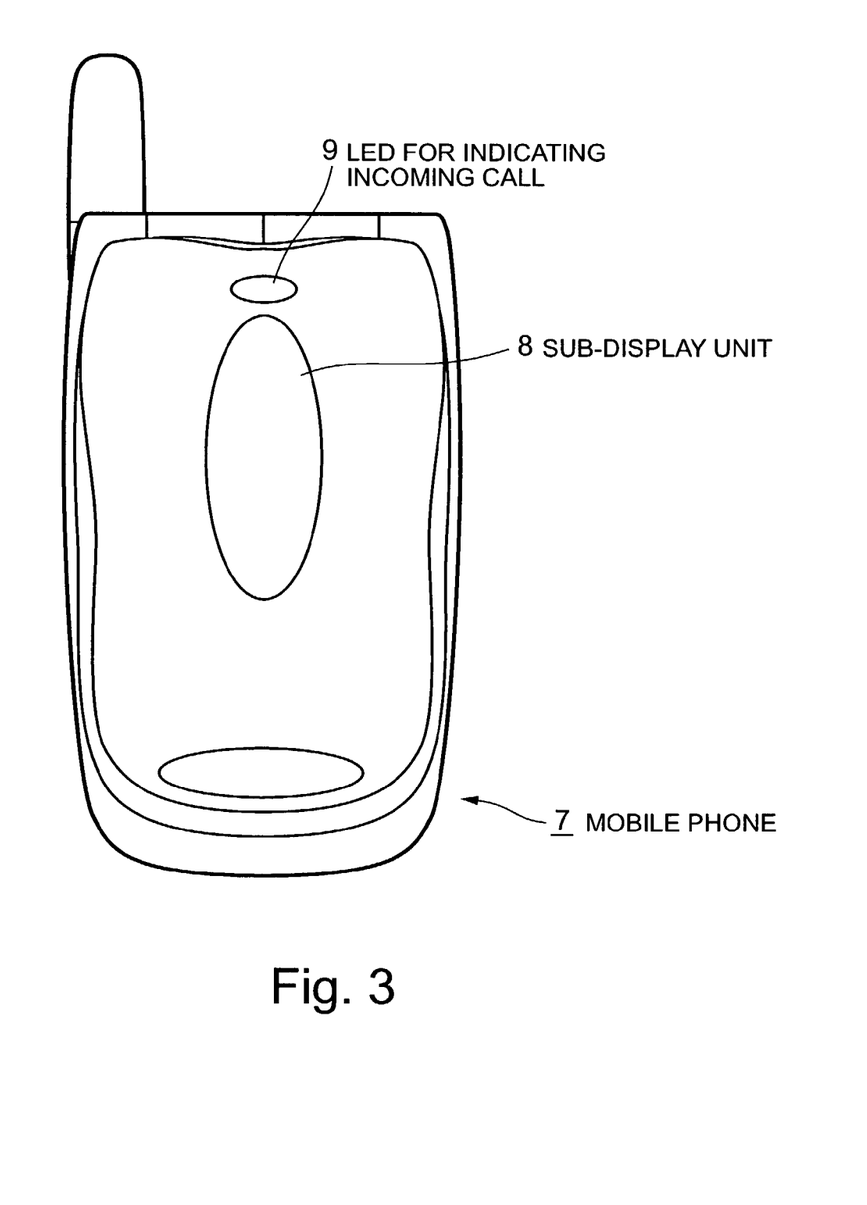
FIG. 3 is a view showing a structure of a mobile phone according to the present invention.
Figure 4:
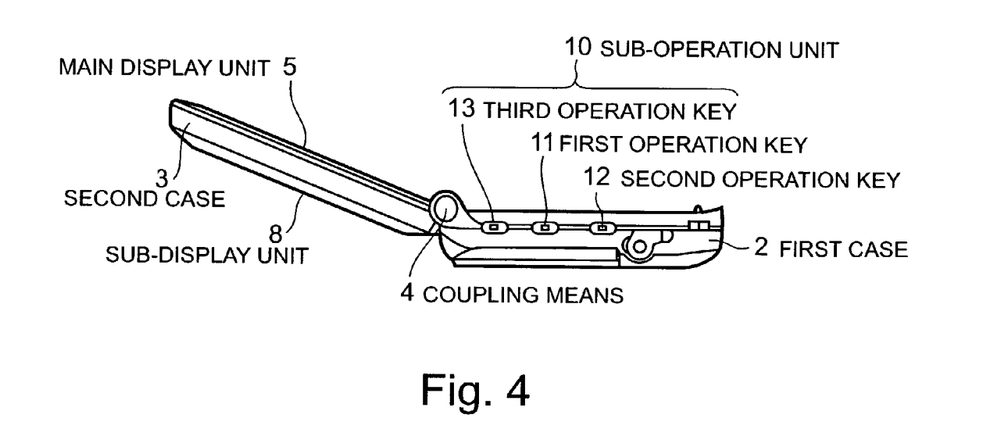
FIG. 4 is a side view showing the mobile phone of the present invention in a state where a second case thereof is opened, which is viewed from a long edge thereof.
Figure 5:
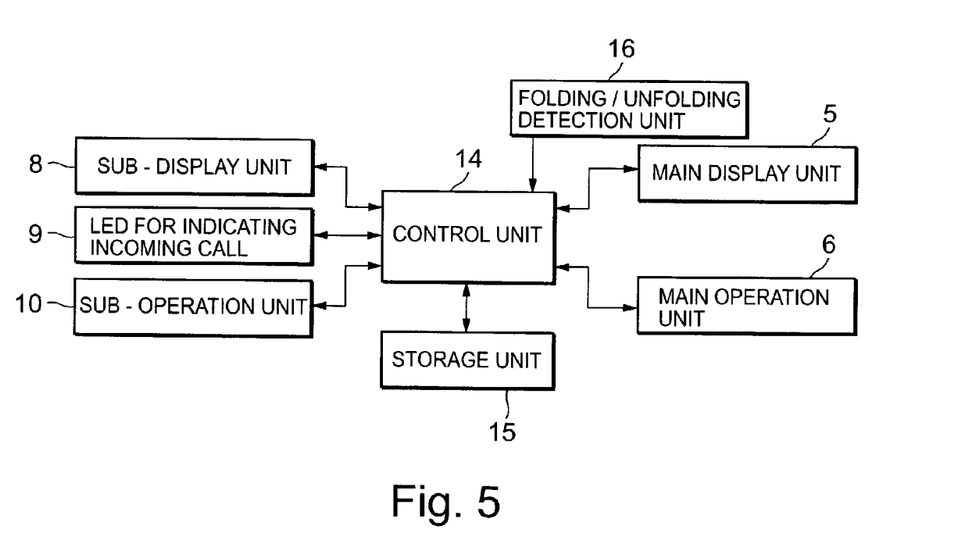
FIG. 5 is a block diagram showing a structure of the mobile phone of the present invention.

A structure of the present invention will be described with reference to FIG. 3 to FIG. 5. FIG. 3 is a view showing a structure of a mobile phone according to the present invention, and is a plan view showing a state in which the mobile phone is folded. FIG. 4 is a side view showing the mobile phone shown in FIG. 3 in a state where a second case thereof is opened, which is viewed from a long edge thereof. FIG. 5 is a block diagram showing a structure of internal circuits of the mobile phone according to the present invention.

As shown in FIG. 3, the mobile phone of the present invention has a structure in which the second case 3 is provided with a sub-display unit 8 and an LED 9 for indicating an incoming call, both of which can be watched even in a state where the mobile phone is folded.

As shown in FIG. 4, the second case 3 is attached to a first case 2 by use of coupling means 4. A main display unit 5 is provided on a surface (main surface) of the second case 3, the surface being positioned at the front when the second case 3 is opened. The sub-display unit 8 is provided on a back surface of the second case 3, the back surface being reverse to the main surface on which the main display unit 5 is provided. A main operation unit 6 (illustration thereof is omitted in FIG. 4) is provided at the front of the first case 2. The main operation unit 6 has a button and key switches such as a dial key, a scroll key, and a cursor key.

Moreover, in the mobile phone of the present invention, a sub-operation unit 10 is provided on a side surface of the first case 2.

The sub-operation unit 10 is provided with a first operation key 11, a second operation key 12, and a third operation key 13. Correspondingly to operations of these keys, in a storage unit 15, registered are a short cut function for setting a useful function (for example, a ring tone, an LED for indicating an incoming call, or the like) for a case in which a change is made in a state where the mobile phone is folded; and a short cut function in which a function cannot be set unless the first to third operation keys 11 to 13 are operated in a state where the mobile phone is unfolded. A useful function denotes a function which can be changed only by checking display on the sub-display unit 8 and operating with the sub-operation unit 10. A short cut function denotes a function of making it possible to jump to a desired select screen in one operation of a key by previously registering a specific select item in the storage unit 15.

The first to third operation keys 11 to 13 are set as keys for executing a short cut function.

Note that it may be adopted that a predetermined short cut function can be registered in the storage unit 15 while being made to directly correspond to any one of the first to third operation keys 11 to 13 by an operation of the main operation unit 6. Moreover, it may be adopted that, when a function is registered while being made to correspond to a short cut key, the same function is simultaneously set to any one of the first to third operation keys 11 to 13.

The first operation key 11 is used as a short cut key or a select key. The second operation key 12 and the third operation key 13 are used as scroll keys for scrolling character information displayed on the sub-display unit 8 in a forward direction and a backward direction.

FIG. 4 shows a structure in which the sub-operation unit 10 is provided on the side surface of the first case 2 along the long edge of the first case 2. However, the sub-operation unit 10 may be provided on a side surface of the second case 3 along a long edge of the second case 3, or on a side surface of the first case 2 or the second case 3 along a short edge of the first case 2 or the second case 3. Alternatively, the sub-operation unit 10 may be formed on any surface as far as the sub-operation unit 10 is located at a position where the sub-operation unit 10 can be watched from an outside when the second case 3 is closed or where the sub-operation unit 10 can be operated in a state in which the second case 3 is closed.

As shown in FIG. 5, the mobile phone of the present invention is structured so as to include a control unit 14 and the storage unit 15. The control unit 14 is intended to select and set various functions included in the mobile phone in accordance with instructions entered by use of the operation keys of the main operation unit 6 or the sub-operation unit 10. The storage unit 15 stores image information to be displayed on the main display unit 5 and the sub-display unit 8 and various pieces of information registered by a user.

The control unit 14 has a structure including a CPU and a recording medium on which a control program is recorded for causing the CPU to execute select and setting processes of the various functions of the mobile phone, for example. The CPU executes processes described below in accordance with the control program recorded on the recording medium. A folding/unfolding detection unit 16 detects whether the second case 3 is in an open state or in a closed state.

Next, operation procedures of the mobile phone of the present invention will be described with reference to FIGS. 6 and 7.

Note that, in the following, a description will be given by taking as an example a case in which a ring tone is set to a desired sound or melody by use of the sub-operation unit. It is assumed that plural kinds of ring tones or melodies are previously registered in the storage unit 15.

Figure 6:
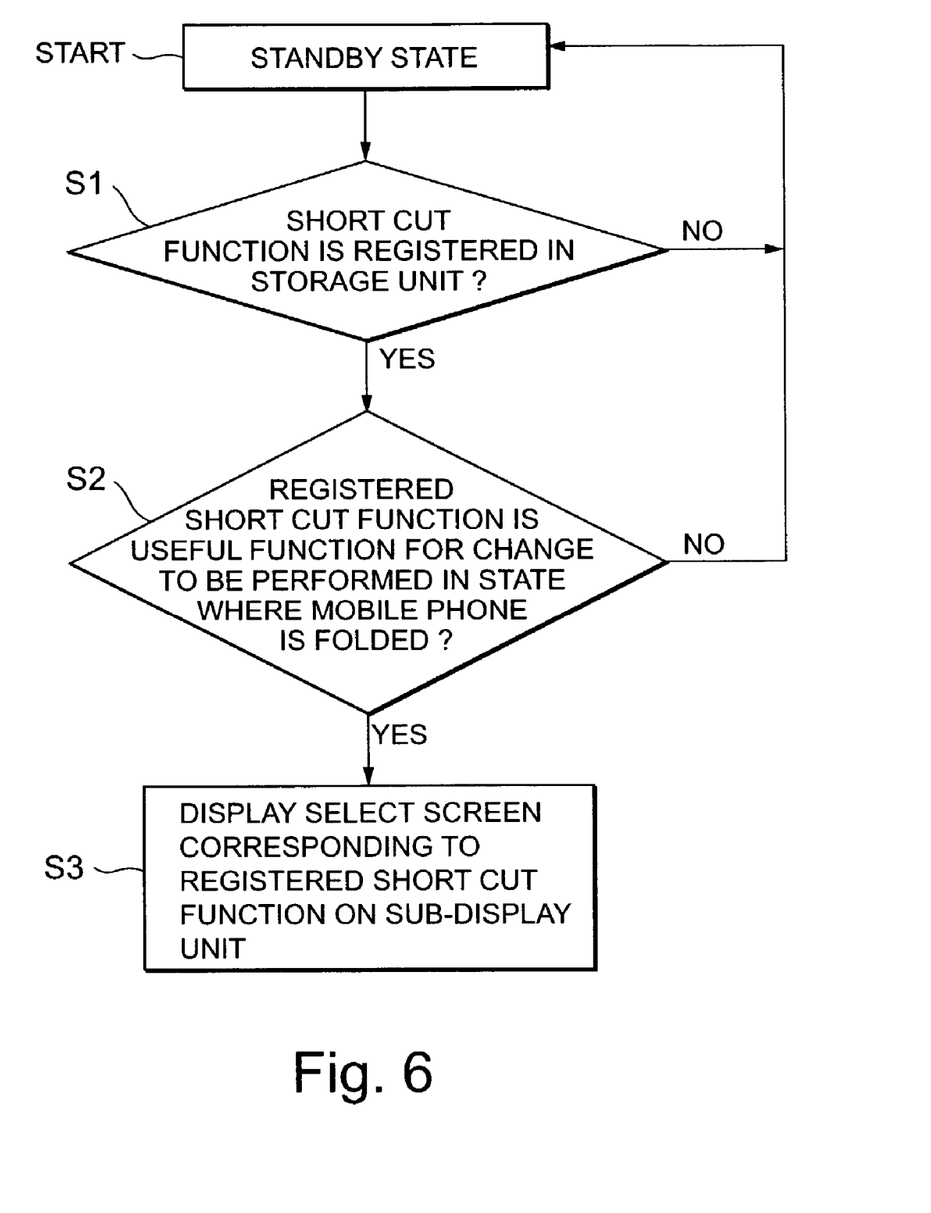
FIG. 6 is a flowchart showing operation procedures of the mobile phone of the present invention.

FIG. 6 is a flowchart showing the operation procedures of the mobile phone shown in FIG. 3. FIG. 7 is a view showing a screen of the sub-display unit 8 shown in FIG. 3, and is a plan view showing an example of a setting screen for the ring tone.

As shown in FIG. 6, in a case where the mobile phone is folded in a standby state (Start), current date and time are displayed on the sub-display unit 8 in accordance with instructions by the control unit 14, for example.

In such a state, if the user of the mobile phone pushes the first operation key 11, the control unit 14 firstly determines whether or not a short cut function is registered as a function to be executed in accordance with an operation of the sub-operation unit 10 in the storage unit 15 (Step S1).

Figure 7:
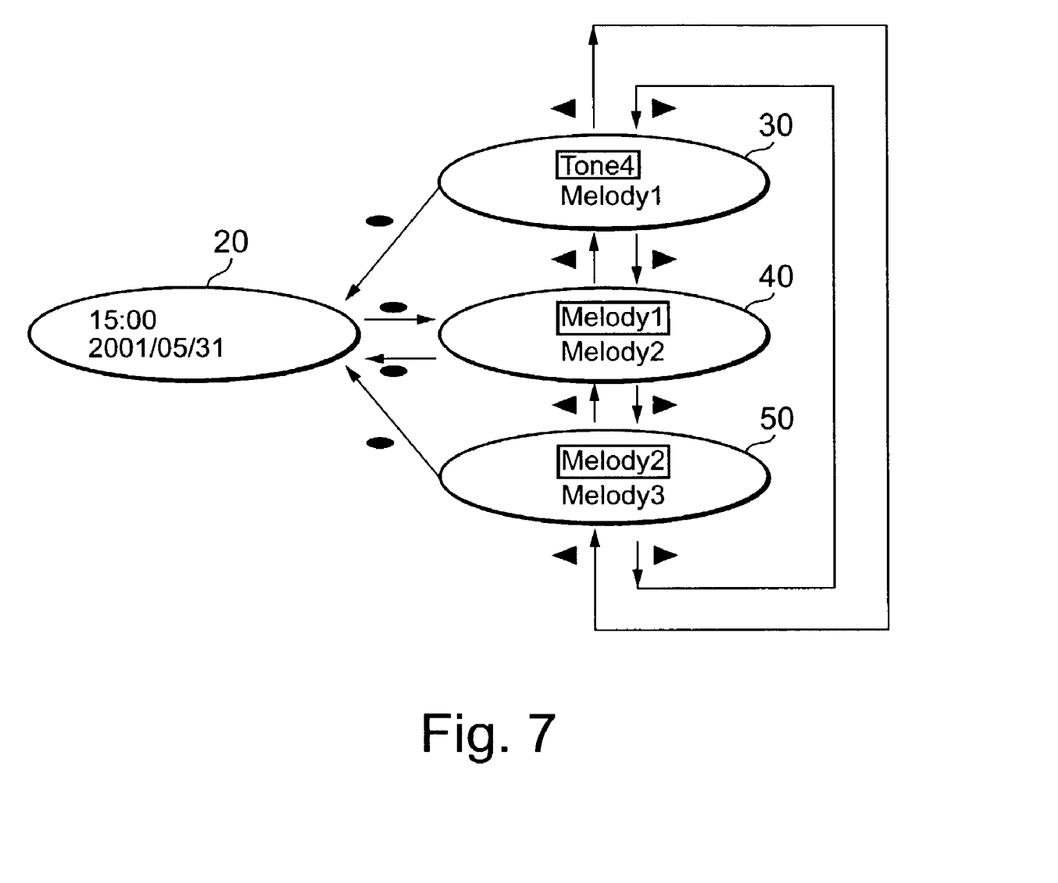
FIG. 7 is a plan view showing an example of a setting screen for a ring tone, the setting screen being displayed on a sub-display unit in the mobile phone of the present invention.

In a case where a short cut function is not registered as a function to be executed in accordance with an operation of the sub-operation unit 10 in the storage unit 15, the control unit 14 causes the sub-display unit 8 to display the current date and time similarly to the standby state as shown in a display screen 20 in FIG. 7.

In a case where a short cut function is registered as a function to be executed in accordance with an operation of the sub-operation unit 10 in the storage unit 15, the control unit 14 determines whether or not the short cut function registered in the storage unit 15 is a useful function for a case in which the user changes a setting for the ring tone, the LED for indicating an incoming call, or the like in a state where the mobile phone is folded (Step S2).

In a case where a short cut function is registered in the storage unit 15 as a setting of an operation function by use of the sub-operation unit 10 but where the short cut function is a non-useful function (for example, a setting function for "Phone Book," in which the user selects a destination phone number while watching the main display unit 5) for a case in which a change is made in a state where the mobile phone is folded, the control unit 14 causes the sub-display unit 8 to display the current date and time similarly to the standby state.

On the other hand, in a case where a short cut function for changing the ring tone or the color of light of the LED for indicating an incoming call is registered in the storage unit 15 as a setting of an operation by use of the sub-operation unit 10, the control unit 14 causes the sub-display unit 8 to display a select screen corresponding to the registered short cut function (Step S3). Here, a setting function for the ring tone is registered. Accordingly, the control unit 14 causes the sub-display unit 8 to display a select screen for selecting "Melody 1" or "Melody 2" as shown in a display screen 40 in FIG. 7, for example.

Next, in a case where the number of the registered sounds or melodies which can be set is more than one, the user can scroll the screen by pushing the second operation key 12 or the third operation key 13 of the sub-operation unit 10 to display a select screen for selecting "Tone 4" or "Melody 3" as shown in a display screen 30 or 50 in FIG. 7, for example.

If the user pushes the first operation key 11 in a state where a cursor (square portion on the display screens 30 to 50 in FIG. 7) is positioned to a desired sound or melody, the control unit 14 determines a setting of the ring tone which is designated by the cursor.

Note that, in a case where a setting function for the LED for indicating an incoming call is registered as the short cut function, it is possible to set the LED 9 for indicating an incoming call to a desired color of light among plural kinds of colors of light by an operation similar to the foregoing.

After the above described setting operation for a ring tone or the LED for indicating an incoming call by use of the sub-operation unit 10 is finished, the control unit 14 causes the sub-display unit 8 to display the current date and time again similarly to the standby state.

Accordingly, for a function, such as the ring tone or the LED for indicating an incoming call, which is useful for a case of a change performed in a state where the mobile phone is folded, the user can easily change a setting by operating the sub-operation unit 10 while watching the sub-display unit 8 even in a state where the mobile phone is folded. Moreover, it is not necessary to open the second case 3 every time the user makes a setting, thus saving trouble in comparison with a conventional mobile phone.

Note that it may be adopted that a plurality of short cut functions can be registered correspondingly to the sub-operation unit 10 as functions which can be selected. In this case, the number of operation keys should be increased in response to the number of functions which can be selected. Thus, even when the number of operation keys of the sub-operation unit 10 is increased like this, if the sub-operation unit 10 is located on the side surface of the first case 2 or the second case 3 along the long edge of the first case 2 or the second case 3, it is possible to provide more operation keys in comparison with a case where the sub-operation unit 10 is located on the side surface of the first case 2 or the second case 3 along the short edge of the first case 2 or the second case 3.

Since the present invention is structured as described above, the present invention has effects described below.

A mobile phone of the present invention has a sub-display unit and a sub-operation unit, each of which is provided on any one of a first case and a second case. Thus, it is possible to change a ring tone and a color of light of an LED for indicating an incoming call by use of the sub-operation unit while watching the sub-display unit even in a state where the mobile phone is folded.

Therefore, it is not necessary to open the second case every time a setting is made, and it is possible to save trouble in comparison with a conventional mobile phone. Thus, the present invention facilitates a change of a setting.

Moreover, the sub-operation unit is located on a side surface of the first case along a long edge of the first case. Thus, it is possible to secure a larger area for providing operation keys in comparison with a case where the sub-operation unit is located on a side surface of the first case along a short edge of the first case. Accordingly, a plurality of short cut functions can be registered correspondingly to the sub-operation unit as functions which can be selected.

While this invention has been described in connection with certain preferred embodiments, it is to be understood that the subject matter encompassed by way of this invention is not to be limited to those specific embodiments. On the contrary, it is intended for the subject matter of the invention to include all alternatives, modifications and equivalents as can be included with the spirit and scope of the following claims.

What is claimed is:

1. A mobile phone of a folding type which includes a first case and a second case, the first case including a main operation unit, the second case including a main display unit on a main surface thereof, the main operation unit and the main display unit being covered in a state where the mobile phone is folded, the mobile phone comprising:
   a sub-display unit which is visible in the state where the mobile phone is folded, the sub-display unit being provided on any one of the first case and the second case;
   a sub-operation unit which can be operated in the state where the mobile phone is folded, the sub-operation unit being provided on any one of the first case and the second case; and
   a control unit which allows a user to at least one of change and view a setting of a function for a case in which a change is made in accordance with an operation by use of the sub-operation unit in a state where the first case and the second case are folded, wherein
   the function corresponds to a specific select item which is to be displayed on the sub-display unit.

2. The mobile phone according to claim 1, further comprising:
   a storage unit for storing the function corresponding to the specific select item which is to be displayed on the sub-display unit.

3. The mobile phone according to claim 1, wherein the sub-display unit is located on a back surface of the second case, the back surface being reverse to the main surface of the second case.

4. The mobile phone according to claim 3,
   wherein the sub-operation unit is located on a side surface of the first case, the side surface being along a long edge of the first case.

5. The mobile phone according to claim 4, wherein the sub-operation unit includes a select key for selecting a ring tone which is previously registered and a scroll key for changing a type of the ring tone, and the sub-display unit displays the type of the ring tone in accordance with an operation of the scroll key.

6. The mobile phone according to claim 4, further comprising:
   a select key for selecting a color of light of an LED for indicating an incoming call, the LED being previously provided on the second case; and
   a scroll key for changing to color of light of the LED for indicating an incoming call,
   wherein the sub-display unit displays a color type of light of the LED for indicating an incoming call in accordance with an operation of the scroll key.

7. The mobile phone according to claim 3,
   wherein the sub-operation unit includes a select key for selecting a ring tone which is previously registered and a scroll key for changing a type of the ring tone, and the sub-display unit displays the type of the ring tone in accordance with an operation of the scroll key.

8. The mobile phone according to claim 3, further comprising:
   a select key for selecting a color of light of an LED for indicating an incoming call, the LED being previously provided on the second case; and
   a scroll key for changing the color of light of the LED for indicating an incoming call,
   wherein the sub-display unit displays a color type of light of the LED for indicating an incoming call in accordance with an operation of the scroll key.

9. The mobile phone according to claim 1, wherein the sub-operation unit is located on a side surface of the first case, the side surface being along a long edge of the first case.

10. The mobile phone according to claim 9, wherein the sub-operation unit includes a select key for selecting a ring tone which is previously registered and a scroll key for changing a type of the ring tone, and the sub-display unit displays the type of the ring tone in accordance with an operation of the scroll key.

11. The mobile phone according to claim 9, further comprising:
    a select key for selecting a color of a light of an LED for indicating an incoming call, the LED being provided on the second case; and
    a scroll key for changing the color of light of the LED for indicating an incoming call,
    wherein the sub-display unit displays a color type of light of the LED for indicating an incoming call in accordance with an operation of the scroll key.

12. The mobile phone according to claim 1,
    wherein the sub-operation unit includes a select key for selecting a ring tone which is previously registered and a scroll key for changing a type of the ring tone, and the sub-display unit displays the type of the ring tone in accordance with an operation of the scroll key.

13. The mobile phone according to claim 1, further comprising:
    a select key for selecting a color of light of an LED for indicating an incoming call, the LED being previously provided on the second case; and
    a scroll key for changing the color of light of the LED for indicating an incoming call,
    wherein the sub-display unit displays a color type of light of the LED for indicating an incoming call in accordance with an operation of the scroll key.

14. A mobile phone of a folding type which includes a first case and a second case, the first case including a main operation unit, the second case including a main display unit on a main surface thereof, the main operation unit and the main display unit being covered in a fold state where the mobile phone is folded, the mobile phone comprising:
    a sub-operation unit which can be operated in the fold state, the sub-operation unit being provided on any one of the first case and the second case;

a sub-display unit which is visible in the fold state where the mobile phone is folded, the sub-display unit being provided on any one of the first case and the second case;

a storage unit; and a control unit configured to register at least one function as a shortcut function corresponding to the sub-operation unit in the storage unit in response to an operation by a user and to make the sub-display to display a screen for the registered function in response to an operation of the sub-operation unit in the fold state.

15. The mobile phone according to claim 14, wherein the sub-operation unit includes a select key for selecting a ring tone which is previously registered and a scroll key for changing a type of the ring tone, and the sub-display unit displays the type of the ring tone in accordance with an operation of the scroll key.

16. The mobile phone according to claim 14, further comprising:

a select key for selecting a color of light of an LED for indicating an incoming call, the LED being provided on the second case; and a scroll key for changing the color of light of the LED for indicating an incoming call, wherein the sub-display unit displays a color type of light of the LED for indicating an incoming call in accordance with an operation of the scroll key.

17. The mobile phone according to claim 14, wherein the operation is performed on the main operation unit.

18. The mobile phone according to claim 14, wherein the control unit makes the sub-display to display the registered function in accordance with the registered function being useful in the fold state.

19. The mobile phone according to claim 18, wherein the registered function is useful in the fold state in a case where the registered function comprises one of a setting of a ring tone and a setting of an LED for indicating an incoming call.

20. A mobile phone of a folding type which includes a first case and a second case, the first case including a main operation unit, the second case including a main display unit on a main surface thereof, the main operation unit and the main display unit being covered in a fold state where the mobile phone is folded, the mobile phone comprising:

a sub-display unit which is visible in the fold state, the sub-display unit being provided on any one of the first case and the second case;

a sub-operation unit which can be operated in the fold state, the sub-operation unit being provided on any one of the first case and the second case; and a control unit configured to determine whether a setting of a function corresponding to the sub-operation unit is viewable in the fold state, and to make the sub-display to display a screen for the function in the fold state in a case where the function is viewable in the fold state.

21. The mobile phone according to claim 20, wherein the function comprises one of a setting of a ring tone and a setting of an LED for indicating an incoming call.

22. The mobile phone according to claim 20, wherein the sub-operation unit includes a select key for selecting a ring tone which is previously registered and a scroll key for changing a type of the ring tone, and the sub-display unit displays the type of the ring tone in accordance with an operation of the scroll key.

23. The mobile phone according to claim 20, further comprising:

a select key for selecting a color of light of an LED for indicating an incoming call, the LED being provided on the second case; and a scroll key for changing the color of light of the LED for indicating an incoming call, wherein the sub-display unit displays a color type of light of the LED for indicating an incoming call in accordance with an operation of the scroll key.

24. A mobile phone of a folding type which includes a first case and a second case, the first case including a main operation unit, the second case including a main display unit on a main surface thereof, the main operation unit and the main display unit being covered in a fold state where the mobile phone is folded, the mobile phone comprising:

a sub-operation unit which can be operated in the fold state, the sub-operation unit being provided on any one of the first case and the second case;

a sub-display unit which is visible in the fold state where the mobile phone is folded, the sub-display unit being provided on any one of the first case and the second case;

a storage unit; and a registering means for registering at least one function as a shortcut function corresponding to the sub-operation unit in the storage unit in response to an operation by a user and for making the sub-display to display a screen for the registered function in response to an operation of the sub-operation unit in the fold state.

25. A mobile phone of a folding type which includes a first case and a second case, the first case including a main operation unit, the second case including a main display unit on a main surface thereof, the main operation unit and the main display unit being covered in a state where the mobile phone is folded, the mobile phone comprising:

a sub-display unit which is visible in the state where the mobile phone is folded, the sub-display unit being provided on any one of the first case and the second case;

a sub-operation unit which can be operated in the state where the mobile phone is folded, the sub-operation unit being provided on any one of the first case and the second case; and a control unit for setting a useful function for a case in which a change is made in accordance with an operation by use of the sub-operation unit in a state where the first case and the second case are folded, wherein the useful function comprises a function corresponding to a specific select item which is to be displayed on the sub-display unit, and the sub-operation unit includes a select key for selecting a ring tone which is previously registered and a scroll key for changing a type of the ring tone, and the sub-display unit displays the type of the ring tone in accordance with an operation of the scroll key.

26. A mobile phone of a folding type which includes a first case and a second case, the first case including a main operation unit, the second case including a main display unit on a main surface thereof, the main operation unit and the main display unit being covered in a state where the mobile phone is folded, the mobile phone comprising:

a sub-display unit which is visible in the state where the mobile phone is folded, the sub-display unit being provided on any one of the first case and the second case;

a sub-operation unit which can be operated in the state where the mobile phone is folded, the sub-operation unit being provided on any one of the first case and the second case;

a select key for selecting a color of light of an LED for indicating an incoming call, the LED being previously provided on the second case; and a scroll key for changing the color of light of the LED for indicating an incoming call, and a control unit for setting a useful function for a case in which a change is made in accordance with an operation by use of the sub-operation unit in a state where the first case and the second case are folded, wherein the useful function comprises a function corresponding to a specific select item which is to be displayed on the sub-display unit, and the sub-display unit displays a color type of light of the LED for indicating an incoming call in accordance with an operation of the scroll key.

* * * * *